(12) United States Patent
Goergen et al.

(10) Patent No.: US 12,453,500 B2
(45) Date of Patent: Oct. 28, 2025

(54) POROELASTIC MATERIALS, BIOSENSORS COMPRISING POROELASTIC MATERIALS, AND METHODS OF MAKING AND USING POROELASTIC MATERIALS AND BIOSENSORS

(71) Applicants: Purdue Research Foundation, West Lafayette, IN (US); Triad National Security, LLC, Los Alamos, NM (US)

(72) Inventors: Craig J. Goergen, West Lafayette, IN (US); Chi Hwan Lee, West Lafayette, IN (US); Bongjoong Kim, Seoul (KR); Kwan-Soo Lee, Los Alamos, NM (US)

(73) Assignees: Purdue Research Foundation, West Lafayette, IN (US); Triad National Security, LLC, Los Alamos, NM (US)

( * ) Notice: Subject to any disclaimer, the term of this patent is extended or adjusted under 35 U.S.C. 154(b) by 788 days.

(21) Appl. No.: 17/742,186

(22) Filed: May 11, 2022

(65) Prior Publication Data

US 2022/0363860 A1 Nov. 17, 2022

Related U.S. Application Data

(60) Provisional application No. 63/186,942, filed on May 11, 2021.

(51) Int. Cl.
*A61B 5/268* (2021.01)
*A61B 5/263* (2021.01)
(Continued)

(52) U.S. Cl.
CPC .............. *A61B 5/263* (2021.01); *A61B 5/268* (2021.01); *C08G 77/06* (2013.01); *C08G 77/12* (2013.01);
(Continued)

(58) Field of Classification Search
CPC ......... A61B 5/265; A61B 5/266; A61B 5/268; A61B 5/271; A61B 5/277; C08J 9/40; C08K 3/08; C08K 2003/0806
See application file for complete search history.

(56) References Cited

U.S. PATENT DOCUMENTS 10,441,185 B2 * 10/2019 Rogers ................... A61B 5/287
2002/0022136 A1 * 2/2002 Valade .................... C08L 83/04
528/10

(Continued)

FOREIGN PATENT DOCUMENTS

DE 102015206065 A1 * 10/2015 ............. B05D 5/12
KR 20120052775 A * 7/2015 ............. C08J 9/228
(Continued)

*Primary Examiner* — Eun Hwa Kim
(74) *Attorney, Agent, or Firm* — Hartman Global IP Law; Gary M. Hartman; Domenica N. S. Hartman

(57) ABSTRACT

Poroelastic materials, methods of making such materials, biosensors comprising such materials, and methods of making and using such biosensors. According to one aspect, a poroelastic material is formed by a process that includes depositing a prepolymer composition on a substrate, annealing the prepolymer composition in a pressurized steam environment at a temperature and for a duration sufficient to form a porous medium having a solid matrix formed of a polymer derived from the prepolymer composition, infiltrating the porous medium with a liquid that includes electrically conductive nanomaterials such that the electrically conductive nanomaterials are located within pores of the porous medium, and evaporating the liquid such that the electrically conductive nanomaterials remain in and/or connected through the pores of the porous medium.

20 Claims, 11 Drawing Sheets

(51) Int. Cl.
  *C08G 77/06* (2006.01)
  *C08G 77/12* (2006.01)
  *C08J 3/24* (2006.01)
  *C08J 9/12* (2006.01)
  *C08J 9/40* (2006.01)
  *C08K 3/08* (2006.01)
  *C08G 77/00* (2006.01)

(52) U.S. Cl.
  CPC ........... *C08J 3/242* (2013.01); *C08J 9/125* (2013.01); *C08J 9/40* (2013.01); *C08K 3/08* (2013.01); *A61B 2562/12* (2013.01); *A61B 2562/164* (2013.01); *C08G 77/80* (2013.01); *C08J 2203/10* (2013.01); *C08J 2205/044* (2013.01); *C08J 2207/10* (2013.01); *C08J 2383/05* (2013.01); *C08K 2003/0806* (2013.01); *C08K 2201/001* (2013.01); *C08K 2201/011* (2013.01)

(56) References Cited

U.S. PATENT DOCUMENTS

| | | | | |
|---|---|---|---|---|
| 2014/0371562 | A1* | 12/2014 | Lee | B05D 7/5883 427/2.12 |
| 2021/0144848 | A1* | 5/2021 | Chung | H05K 1/115 |
| 2022/0364270 | A1* | 11/2022 | Lee | A61B 5/27 |

FOREIGN PATENT DOCUMENTS

| | | | |
|---|---|---|---|
| WO | WO-02082468 A1 * | 10/2002 | C08K 9/02 |
| WO | WO-2017108215 A1 * | 6/2017 | A61B 5/6833 |

* cited by examiner

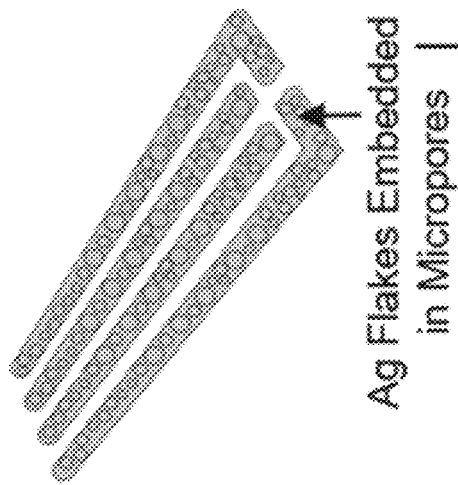 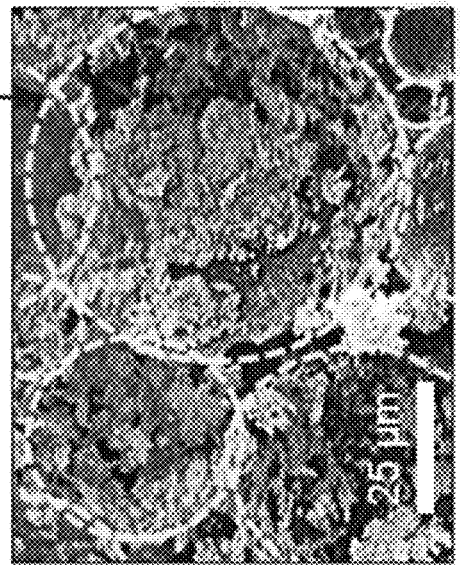
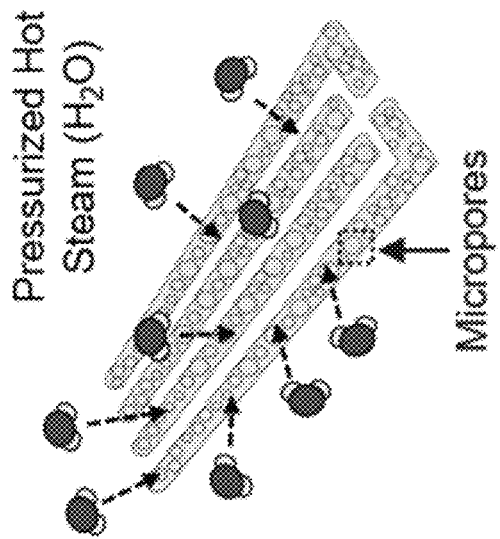 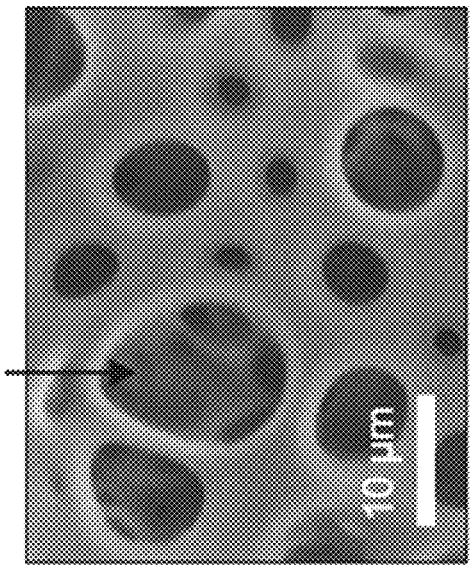
FIG. 3B          FIG. 3C

POROELASTIC MATERIALS, BIOSENSORS COMPRISING POROELASTIC MATERIALS, AND METHODS OF MAKING AND USING POROELASTIC MATERIALS AND BIOSENSORS

CROSS-REFERENCE TO RELATED APPLICATIONS

This application claims the benefit of U.S. Provisional Application No. 63/186,942 filed May 11, 2021, the contents of which are incorporated herein by reference.

BACKGROUND OF THE INVENTION

The present invention generally relates to biosensors. The invention particularly relates to biosensors that include poroelastic materials and methods of making and using such biosensors, including but not limited to making and using the biosensors in vivo.

The growing need for the implementation of stretchable biosensors in the human body and organ systems has driven a new rapid prototyping scheme through the direct ink writing of multidimensional functional architectures. The arbitrary shape and size of these biosensors meet the requirement of being adaptable or adaptive to geometric nonlinearities of specific biological sites.

Recent approaches involve the use of biocompatible viscoelastic inks that are dispensable through an automated nozzle injection system. However, the pragmatic application of these inks remains challenging in certain medical practices that demand long-term reliable recording due to their viscoelastic nature that yields both mechanical and electrical hysteresis under periodic large strain cycles, a notable but nonlimiting example is strain cycles associated with cardiac cycles.

Printed biosensors are integral to the development of various medical research platforms and their broad applications at all scales from cellular to organ levels. Direct ink writing (DIW) of multidimensional functional architectures on various biological substrates enables rapid prototyping and customization of a range of biosensors with geometrical complexities. This approach eliminates the need for multiple steps, masks, and dedicated tools that are typically required in conventional lithography-based techniques. Advanced strategies involve the use of electrically conductive polymer inks or silicone composite inks containing electrically conductive nanomaterials to serve as dispensable inks for a nozzle injection system that allows for automated rapid prototyping. To this end, it requires precise control of the rheological properties of the inks in order to ensure high-precision printability for sophisticated rendering at the microscale and prevent the hindering of the densely dispersed nanomaterials from the polymerization of the inks. Despite some successes, these inks generally exhibit both mechanical and electrical hysteresis under periodic large strains due to their viscoelastic nature or/and result in irreversible degradation in electrical conductivity due to the difficulty of maintaining the percolation network of the conductive nanomaterials. In addition, the viscoelastic inks may produce a risk for delamination from the biocompatible substrates under a large deformation due to the low interaction energy at the interface and the discrepancy in their intrinsic elasticity. The fundamental limitations of these inks impede their implementation in medicine, particularly under conditions that demand reliable recording against repetitive loading, as is necessary for applications relating to monitoring of the cardiac cycle.

In view of the above, it can be appreciated that there are certain problems, shortcomings or disadvantages associated with existing flexible biosensors, and that it would be desirable if methods were available for printing biosensors that were capable of at least partly overcoming or avoiding the problems, shortcomings or disadvantages noted above.

BRIEF DESCRIPTION OF THE INVENTION

The intent of this section of the specification is to briefly indicate the nature and substance of the invention, as opposed to an exhaustive statement of all subject matter and aspects of the invention. Therefore, while this section identifies subject matter recited in the claims, additional subject matter and aspects relating to the invention are set forth in other sections of the specification, particularly the detailed description, as well as any drawings.

The present invention provides, but is not limited to, poroelastic materials, methods of making such materials, biosensors comprising such materials, and methods of making and using such biosensors.

According to one aspect of the invention, a poroelastic material is provided that is formed by a process that includes the steps of depositing a prepolymer composition on a substrate, annealing the prepolymer composition in a pressurized steam environment at a temperature and for a duration sufficient to form a porous medium having a solid matrix formed of a polymer derived from the prepolymer composition, infiltrating the porous medium with a liquid that includes electrically conductive nanomaterials such that the electrically conductive nanomaterials are located within pores of the porous medium, and evaporating the liquid such that the electrically conductive nanomaterials remain in and/or connected through the pores of the porous medium.

According to another aspect of the invention, a method is provided that includes depositing a prepolymer composition on a substrate, annealing the prepolymer composition in a pressurized steam environment at a temperature and for a duration sufficient to form a porous medium having a solid matrix formed of a polymer derived from the prepolymer composition, infiltrating the porous medium with a liquid comprising electrically conductive nanomaterials such that the electrically conductive nanomaterials are located within pores of the porous medium, and evaporating the liquid such that the electrically conductive nanomaterials remain in and/or connected through the pores of the porous medium to result in a poroelastic material.

Additional aspects of the invention include a biosensor comprising the poroelastic material described above that includes a first layer formed of the poroelastic material, a second layer formed of metallic material located on a first surface of the first layer such that the second layer forming interconnections with the electrically conductive nanomaterials of the poroelastic material in the first layer, a third layer formed of a biocompatible metallic material located on and covering the second layer, and a fourth layer formed of a polymer derived from the prepolymer composition located on a second surface of the first layer. Methods of making and using the biosensor are provided as well.

Technical effects of poroelastic material, methods, and biosensors described above preferably include the ability to produce and use implantable devices that are custom fit to biological materials, such as organs, and therefore promote excellent adhesion thereto and electrical interfaces therewith.

Other aspects and advantages of this invention will be appreciated from the following detailed description.

BRIEF DESCRIPTION OF THE DRAWINGS

FIGS. 3A through 3E represent a method of designing and manufacturing a biosensor. The steps of the method include (FIG. 3A) 3D imaging and custom direct ink writing (DIW), (FIG. 3B) steam etching, (FIG. 3C) metallization, (FIG. 3D) post-DIW, and (FIG. 3E) implementation on the epicardial surface of a murine heart.

FIG. 6A represents measured epicardial ECG signals using the custom-printed biosensor. FIG. 6B represents simultaneously measured ECG signals using a control 3-lead electrode set.

DETAILED DESCRIPTION OF THE INVENTION

Figure 1:
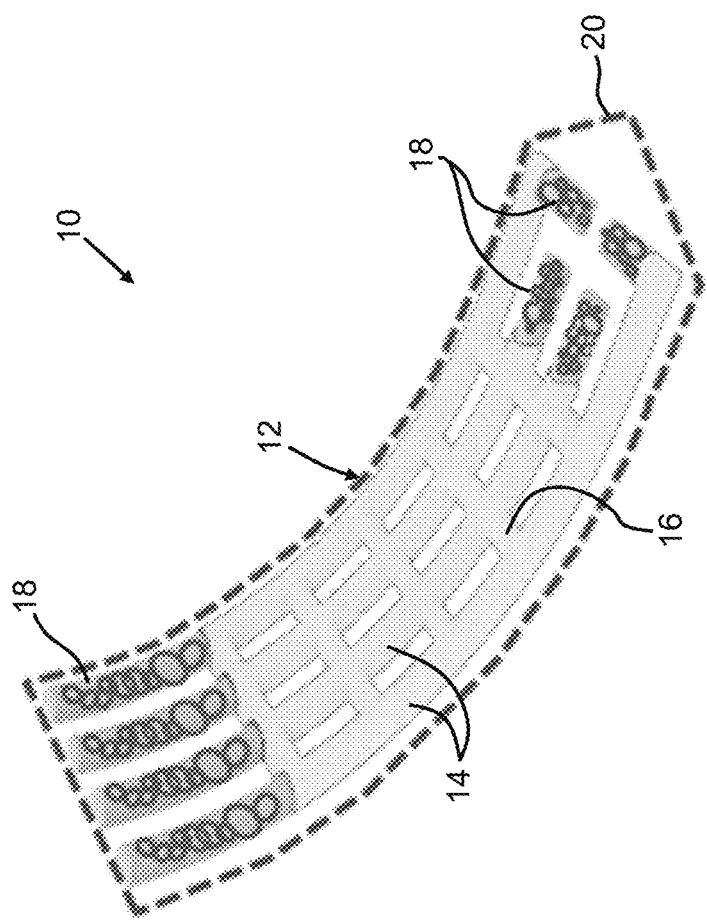
FIG. 1 represents an embodiment of a biosensor in accordance with certain nonlimiting aspects of the present invention.

The intended purpose of the following detailed description of the invention and the phraseology and terminology employed therein is to describe what is shown in the drawings, which relate to one or more nonlimiting embodiments of the invention, and to describe certain but not all aspects of what is depicted in the drawings, including the embodiment(s) to which the drawings relate. The following detailed description also describes certain investigations relating to the embodiment(s) depicted in the drawings, and identifies certain but not all alternatives of the embodiment(s). As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the appended claims, and not the detailed description, are intended to particularly point out subject matter regarded to be aspects of the invention, including certain but not necessarily all of the aspects and alternatives described in the detailed description.

Disclosed herein are poroelastic materials that include a porous medium having a solid matrix formed of a polymer material (e.g., poroelastic silicone composites) with electrically conductive nanomaterials located within and/or connected through pores of the solid matrix. While the poroelastic materials may be used in various applications, they have been found to be particularly suitable in certain implantable biosensors. In particular, these poroelastic materials are believed to provide certain particularly beneficial properties for such applications including, but not limited to, poroelastic behavior (rather than viscoelastic behavior) with reversible compressibility that can effectively suppress both mechanical and electrical hysteresis against repetitive loading cycles, exceptional softness due to the ultra low mechanical (Young's) modulus (e.g., E<30 kPa), and reliable structural integrity in which the electrically conductive nanomaterials are integrated throughout a pore network of the solid matrix that has a significantly reduced the likelihood of delamination or separation against cyclic deformations relative to certain existing biosensors.

The poroelastic materials maybe formed by depositing a prepolymer composition (also referred to herein as an "ink" or "ink composition") on a substrate, and then annealing the prepolymer composition in a pressurized steam environment at a temperature and for a duration sufficient to form a porous medium having a solid matrix formed of a polymer derived from the prepolymer composition. The solid matrix may then be infiltrated with a liquid (e.g., hexane) comprising electrically conductive nanomaterials such that the electrically conductive nanomaterials are located within pores of the solid matrix. The liquid is then removed, for example by evaporation, such that the electrically conductive nanomaterials are within and remain connected through the pores of the solid matrix. In this manner, a composite, poroelastic material can be produced that has a soft, flexible sponge-like foam structure that may be electrically conductive due to the nanomaterials.

In certain embodiments, the prepolymer composition (inks) may be formulated to include a mixture of various materials so that the poroelastic material is a poroelastic silicone composite. As a nonlimiting example, in investigations leading to the present invention, poroelastic silicone composites were produced from prepolymer compositions that were prepared by blending a base resin, a dilute resin, and a physical cross-linker. The base resin comprised a vinyl terminated diphenylsiloxane-dimethyl silicone copolymer, a methylhydrosiloxane copolymer, and a siloxane monomer, the dilute resin comprised a polydimethylsiloxane elastomer and one or more curing agents, and the physical cross-linker comprised polysiloxane-treated hydrophobic silica ($SiO_2$—PS) particles, or hydrophobic silica particles, or hydrophobic particles, or combinations thereof. For the investigations, the blended prepolymer compositions were prepared to have various weight ratios of the base resin, the dilute resin, and the physical cross-linker. Some inks had a base resin:dilute resin:physical cross-linker weight ratio of from 5.7:3.3:1.0 to 6.0:3.3:0.7, while for other evaluated inks this weight ratio was 4.2:5.0:0.8 or 4.5:5.0:0.5, therefore encompassing a range for the base resin of about 4.2 to 6.0, a range for the dilute resin of about 3.3 to 5.0, and a range for physical cross-linker of about 0.5 to 1.0. However, it should be understood that the invention encompasses prepolymer compositions having weight ratios outside the investigated ranges, as one example, a weight ratio in which range for the physical cross-linker is about 0.1 to 2.0.

For the nonlimiting ink compositions investigated, the base resin contained about 64.5 wt % of the vinyl terminated diphenylsiloxane-dimethyl silicone copolymer, about 33.5 wt % of the methylhydrosiloxane copolymer, and about 2.0 wt % of the siloxane monomer. Furthermore, the vinyl terminated diphenylsiloxane-dimethyl silicone copolymer had a 9:1 weight ratio of PDV-0541 (10,000 cSt) and PDV-0525 (500 cSt), the methylhydrosiloxane copolymer was HMS-151 ((15 to 18% methylhydrosiloxane)-dimethylsiloxane copolymer, trimethylsiloxane terminated (25-35 cSt)), and the siloxane monomer was 1,3,5,7-tetravinyl-1,3,5,7-tetramethylcyclotetrasiloxane. In these nonlimiting ink compositions, the dilute resin was Sylgard 184 (a mixture of 10:1 weight ratio of polydimethylsiloxane elastomer base and curing agent), and the ink compositions included a platinum catalyst (Pt-carbonyl cyclovinylmethylsiloxane complex) in an amount of about 0.1 wt % of the base resin.

The electrically conductive nanomaterials may have various sizes and shapes. For example, the nanomaterials may include but are not limited to nanoparticles, nanoclusters, nanofibers, nanotubes, nanowires, nanorods, nanosheets, nanoflakes, and mixtures thereof. Preferably, the nanomaterials have a maximum average dimension of about 0.1 to about 300 nanometers, and more preferably about 200 nm. Further, the electrically conductive nanomaterials may include various materials, such as but not limited to metals and metal alloys (as nonlimiting examples, silver, or a silver alloy, or electrically conductive nanomaterials, or any mixture thereof).

Preferably, the solid matrix includes a porous network having an average pore size diameter of about 0.1 to about 100 micrometers, more preferably greater than 5 micrometers, for example, from about 5 micrometers to about 50 micrometers. The solid matrix preferably has a Young's modulus (E) of less than or equal to about 150 kPa.

As mentioned previously, the poroelastic materials may be particularly suitable for use in certain biosensors. FIG. 1 represents a nonlimiting example of a biosensor 10 that includes a mesh frame 12 having an array of four separate traces 14 each configured to conduct an electrical charge. Each of the traces 14 includes electrodes 18 at distal ends thereof and are covered with a biocompatible electrically-insulating material (insulator material) between the electrodes 18. The individual traces 14 are physically coupled with links 16 formed of the insulator material. A biocompatible, water-soluble film 20 is secured to the mesh frame 12 and configured to function as a temporary substrate therefor.

Figure 2:
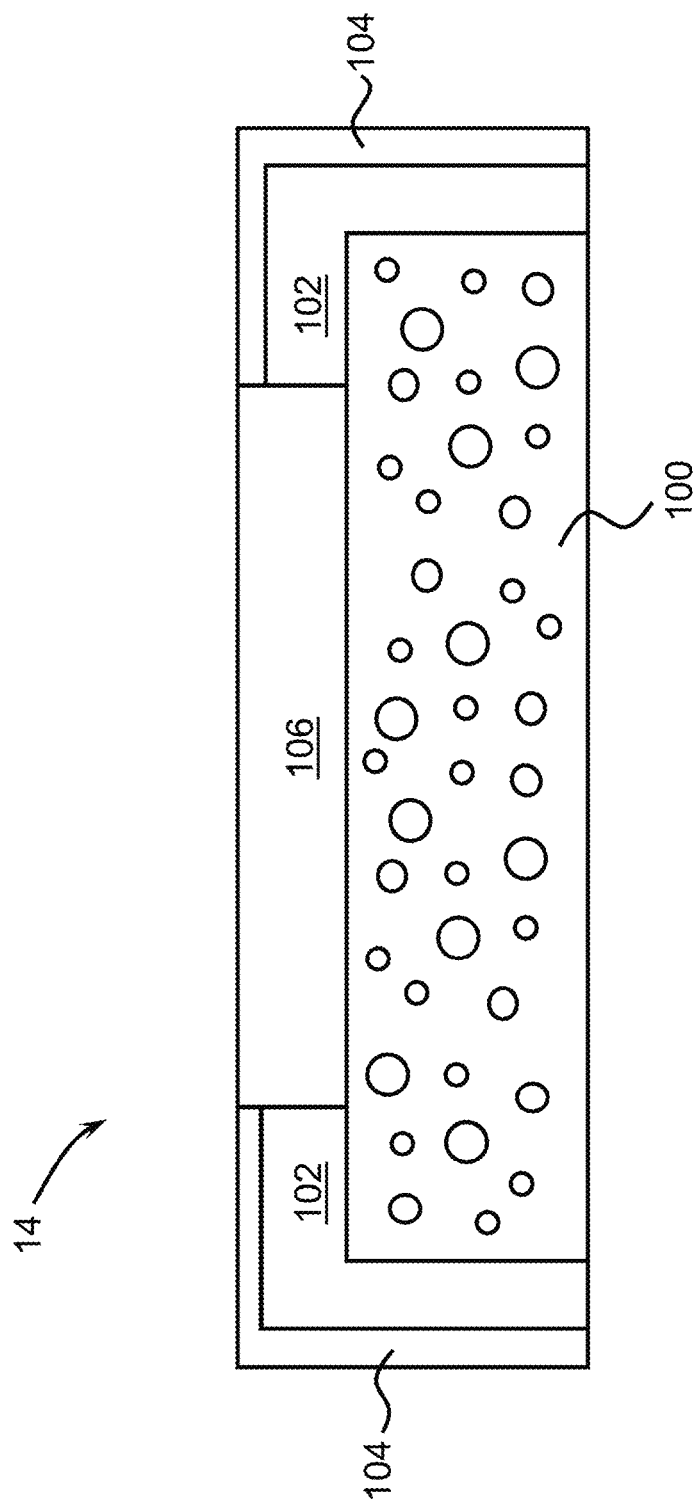
FIG. 2 represents a cross-sectional view of one of the traces of the biosensor of FIG. 1 along a central longitudinal axis thereof. Components represented are not to scale and not proportional.

FIG. 2 schematically represents a longitudinal cross-section of one of the traces 14 (relative sizes of the layers not necessarily to scale, accurate, or proportional). As represented, the trace 14 includes a first layer 100 formed of the poroelastic material. A second layer 102 formed of a metallic material is located on surfaces of the first layer 100 at distal ends thereof. The second layer 102 forms interconnections with the electrically conductive nanomaterials of the poroelastic material in the first layer 100. A third layer 104 formed of a biocompatible metallic material is located on and covers the second layer 102. The links 16 of the insulator material are formed by a fourth layer 106 located on a second surface of the first layer 100 between the distal ends thereof. It should be understood that the biosensor 10 is exemplary, and may include fewer or more traces 14, fewer or additional layers, and various different shapes and patterns of the traces 14 and the mesh frame 12.

Biosensors comprising the poroelastic materials may be used for various applications. In certain embodiments, the biosensor 10 represented in FIG. 1 may be surgically applied to a biological material (e.g., tissue), such as an organ of a subject (living body). In embodiments that include the water-soluble film 20, the film 20 may be dissolved after application of the biosensor 10 to the biological material. As a nonlimiting example, the biosensor 10 may be coupled to a heart of a subject in vivo and used for real-time recording of spatiotemporal electrophysiological activity. In such embodiments, the poroelastic nature of the biosensor 10 may allow for simultaneous real-time spatiotemporal mapping of both electrocardiography and ultrasound signals.

The biosensor 10 may be fabricated by a process that includes the steps of depositing a prepolymer on a substrate and then annealing the prepolymer composition in a pressurized steam environment to form the first layer 100 of each of the traces 14. The prepolymer should be annealed at a temperature and for a duration sufficient to produce a porous medium having a solid matrix formed of a polymer derived from the prepolymer composition. The solid matrix may then be infiltrated with a liquid comprising electrically conductive nanomaterials such that the electrically conductive nanomaterials are located within pores of the solid matrix. The liquid is then removed, for example by evaporation, such that at least some of the electrically conductive nanomaterials are within and remain connected through the pores of the solid matrix.

A metallic material may be deposited on a first surface of the first layer 100 of each of the traces 14 to define the second layer 102. The second layer 102 should form interconnections with the electrically conductive nanomaterials of the poroelastic material in the first layer 100. If the metallic material of the second layer 102 is not sufficiently biocompatible, a biocompatible metallic material may be deposited on the second layer 102 of each of the traces 14 to form the third layer 104 and cover the second layer 102.

A biocompatible insulator material may be deposited on a second surface of the first layer 100 of each of the traces 14 between the distal ends thereof to form the fourth layer 106. In certain embodiments, the insulator material may be a polymer derived from the prepolymer composition used to produce the poroelastic material. More of the insulator material may be deposited to form the links 16 and physically couple the traces 14 to define the mesh frame 12. Optionally, the biocompatible, water-soluble film 20 may be secured to the frame 12 and configured as a temporary substrate therefor.

In certain embodiments, the mesh frame 12 of the biosensor 10 maybe configured to conform to one or more surfaces of a biological material, for example, an organ of a subject. In such embodiments, the biological material may be imaged, mapped, and/or modeled prior to formation of the biosensor 10 to determine the structure of the biosensor 10.

Nonlimiting embodiments of the invention will now be described in reference to some of the experimental investigations that led to the invention. In these investigations, the structure-property relationships of poroelastic silicone composites were analyzed at molecular and microsystemic levels and then evaluated for their applicability in rapid custom prototyping of stretchable biosensors. To demonstrate the utility of these techniques in medical practice, a range of custom-fit biosensors tailored for simultaneous recording and imaging of acute myocardial infarction in vivo were produced. The structural properties of the biosensors were determined to yield a robust and seamless coupling to living tissues, thereby enabling both high-fidelity recording of spatiotemporal electrophysiological activity and real-time ultrasound imaging for visual feedback.

Figure 3A:
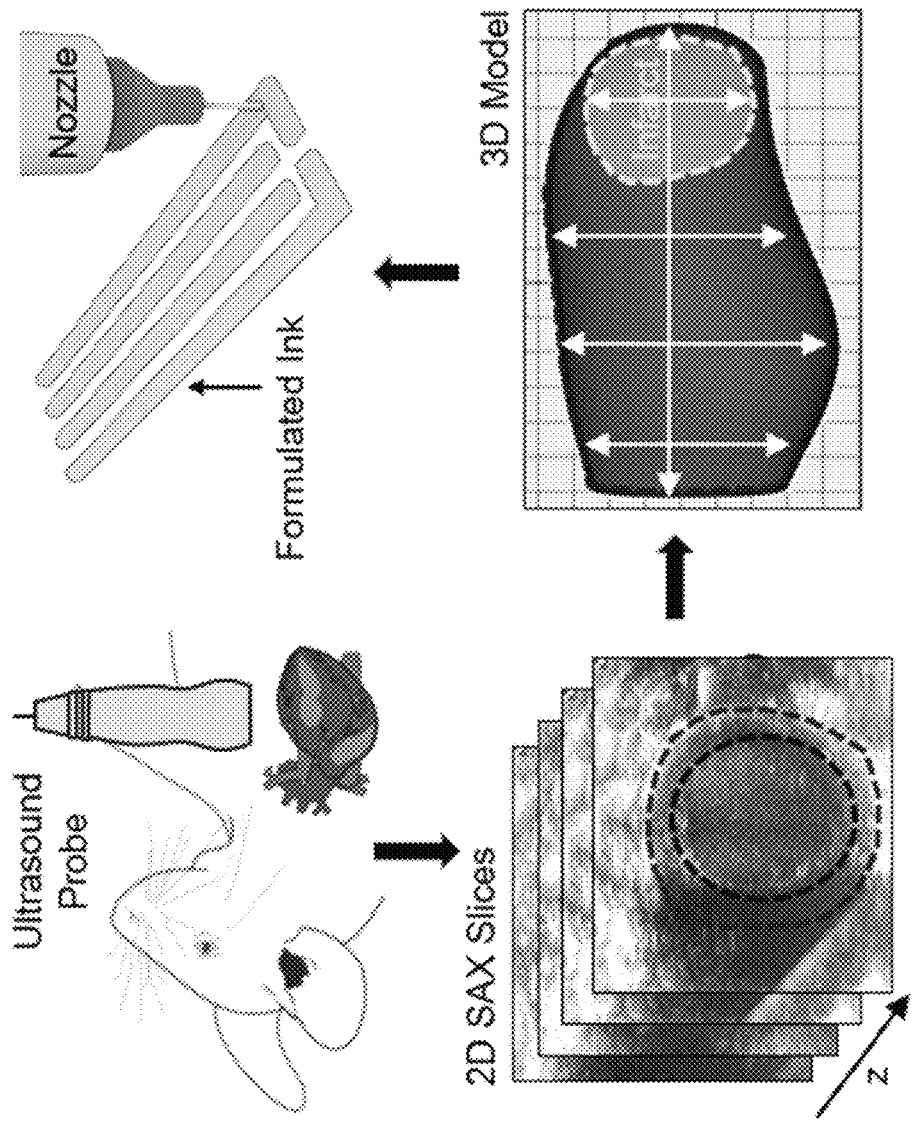

FIGS. 3A through 3E represents steps of a method that was performed to fabricate poroelastic biosensors configured to have a custom fit to an infarcted area of a heart of a subject (in this nonlimiting example, a mouse). To provide for a custom fit, various parameters such as the overall size, geometry, and structure of the infarcted area of the heart was initially captured through four-dimensional (4D) segmentation (i.e., 3D geometric volume over a cardiac cycle) of myocardium via non-invasive ultrasound imaging (FIG. 3A). All ultrasound images were acquired using a small animal ultrasound system (i.e., Vevo 3100 commercially available from FUJIFILM VisualSonics Inc., Toronto, Canada). 4D ultrasound data of adult mouse hearts with well-developed infarcts were acquired via high frequency ultrasound.

The cardiac and respiratory gated 2D short-axis images were acquired from the apex to the base of the left ventricle and spatiotemporally synced to generate the 4D ultrasound data. The reconstructed data was resampled to isotropic voxels and exported to a medical image data segmentation software (SimVascular) for the 3D segmentation at both end-diastolic and peak-systolic timepoints. STL data files of the myocardial wall were then created with uniform meshing and used to design the structures of the biosensor. This 3D geometry was taken into consideration to precisely scale, adjust, and tailor the overall layout of the biosensor to meet conform to a specific geometric accuracy. This custom fit allowed the recording electrodes of the biosensor to be precisely aligned to the position and orientation of the infarcted area of the heart.

Prepolymer materials for use as printable inks were prepared that included a mixture of silicone resins and silica particles to provide both high-precision printability and the capability of turning the ink into a porous medium. Specifically, the prepolymer materials were prepared by blending the following three compositions: a base resin, Sylgard 184, and $SiO_2$—PS silica particle, in a specific weight ratio (5.7:3.3:1.0, 4.2:5.0:0.8, 6.0:3.3:0.7, and 4.5:5.0:0.5) with a mixer (Thinky Mixer) for 5 minutes at 2,000 rpm. The base resin was prepared by blending 64.5 wt % of vinyl terminated diphenylsiloxane-dimethylsiloxane copolymer (a mixture of 9:1 weight ratio of PDV-0541 and PDV-0525), 33.5 wt % of trimethylsiloxane terminated methylhydrosiloxane-dimethylsiloxane copolymer (HMS-151), and 2.0 wt % of 1,3,5,7-tetravinyl-1,3,5,7-tetramethylcyclotetrasiloxane (siloxane monomer). Sylgard 184 (a mixture of 10:1 weight ratio of base and curing agent) was used as a dilute resin. The $SiO_2$—PS particles and a Pt-carbonyl cyclovinylmethylsiloxane complex (Pt catalyst; 0.1 wt % of the amount of base resin) were added and blended using the mixer (Thinky Mixer) for 2 minutes at 2,000 rpm to adjust the rheological properties of the ink. Control inks (e.g., Sylgard 184 and SE 1700) were prepared by mixing the base and curing agent at the standard 10:1 weight ratio.

Once the formulated inks were prepared, substrates were prepared by coating Si wafers with a thin layer (1 µm-thick) of polymethyl methacrylate (PMMA) as a chemically-dissolvable sacrificial layer. The surface of the PMMA layer was exposed with 3-aminopropyltriethoxysilane (APTES) in a vacuum desiccator to form a hydrophilic silane group to improve the adhesion strength. With the substrates prepared, the printing process began by directly writing the formulated inks onto the substrates. An automated nozzle injection system was used that was equipped on a three-axis computer-controlled translation stage (Nordson EFD; minimum inner diameter of nozzles=100 µm; repeatability=±3 µm; dispensing rate=20 mm·min 1). These printing setting offered a capability to uniformly render microscale motifs (thickness greater than or equal to 50 µm-thick; width greater than or equal to 100 µm-wide) that fit into the pre-designed layout of the biosensors.

As presented in FIG. 3B, the selectively patterned traces of the as-printed inks were polymerized into an amorphous sponge-like morphology with a pore diameter ranging from 5 to 50 µm under a pressurized hot steam condition of 120° C. and 15 psi with ramping rates of about 15° C. per minute and about 5.6 psi per minute, respectively. Differential scanning calorimetry (DSC) of the ink confirmed its amorphous character. The formation of the micropores under this condition was attributed to the massive penetration and evaporation of the pressurized water molecules to/from the prepolymer.

The resulting sponge-like foam was then immersed in a mixture solution of hexane (200 ml) and silver (Ag) flakes (0.5 mg; 200 nm to 5 µm in diameter; Inframat Advanced Materials, LLC), allowing the solid matrix to absorb the hexane quickly by capillary action in a manner that trapped the Ag flakes in the internal pores (FIG. 3C).

Select distal ends of the infiltrated solid matrix were then immersed in a copper (Cu) plating solution that contained (1) copper(II) sulfate pentahydrate (CuSO4.5H2O, Sigma-Aldrich; 18 g·L$^{-1}$), (2) Ethylenediaminetetraacetic acid (EDTA, Sigma-Aldrich; 48 g·L$^{-1}$), (3) Potassium hexacyanoferrate(II) trihydrate (K4[Fe(CN)6]·3H2O, Sigma-Aldrich; 600 mg/L), (4) Sodium Hydroxide (NaOH, Fisher scientific; 45 g·L$^{-1}$), (5) Poly(ethylene glycol) (H(OCH2CH2)nOH, Sigma-Aldrich; 500 mg·L$^{-1}$), (6) Formaldehyde (HCHO, Fisher scientific; 20 mL·L$^{-1}$), and (7) hydrochloric acid solution (1 N) (HCl, Fisher Scientific; 18 mL·L$^{-1}$) for 30 minutes. Plating with Cu secured the mechanical and electrical interconnections at the distal ends of the biosensor. The resulting sheet resistance and stretchability were lower than 7.72±1.52 Ω·sq$^{-1}$ and greater than 100%, respectively. The Cu-plated surface was subsequently plated with gold (Au) for 2 minutes using an electroplating system (24K Pure gold plating solution-Bath, Gold Plating Services), followed by thorough rinsing with deionized (DI) water to promote biocompatibility.

Figures 3D, 3E:
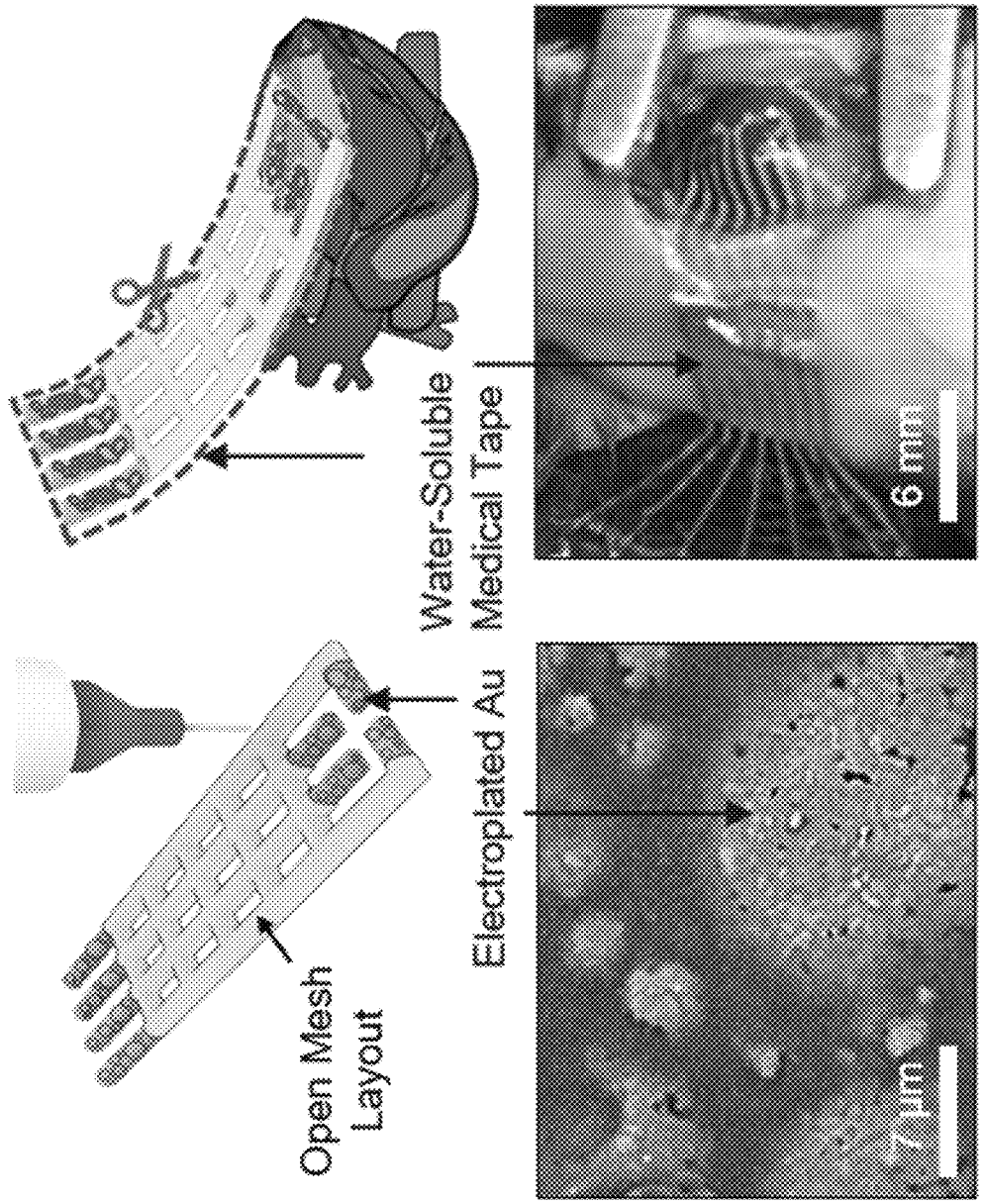

Next, another direct writing of the formulated ink was followed to cover the remainders of the traces and form structural links therebetween to form an open mesh frame to ensure breathability and stretchability (FIG. 3D). The sacrificial PMMA layer between the substrate and the mesh frame was completely dissolved with acetone.

Finally, a water-soluble film made of polyvinyl alcohol (PVA, Sigma-Aldrich; 50 µm-thick) was applied (via dropcast technique) to gently peel the biosensor from the substrate and then trimmed to remove excess areas using scissors (FIG. 3E). The water-soluble film provided excellent biocompatibility and this material has been used for many implantable medical devices without inflammatory responses. Here, the water-soluble film was used as a temporary supporting layer to facilitate its easy integration across the surface of the heart under median sternotomy, which thereafter was dissolved within no more than 30 seconds by applying a warm saline solution. A computational analysis revealed that the total bending stiffness (or flexural rigidity) of the biosensor decreased exponentially as the supporting layer (i.e., water-soluble film) was dissolved over time due to its cubic dependence on thickness. The extremely low bending stiffness (less than $8.0 \times 10^7$ GPa·μm$^4$) could substantially reduce the required minimum adhesion energy per unit area, thereby providing a strong capillary adhesion to the epicardium.

To obtain desirable rheological properties for the ink printing process used, the ink (i.e., prepolymer material) was formulated by blending (1) a base resin comprised of vinyl terminated diphenylsiloxane-dimethyl silicone copolymer, methylhydrosiloxane copolymer, and siloxane monomer with the weight ratio of 6.5:3.3:0.2, (2) a dilute resin (Sylgard 184, Dow Corning; 10:1 weight ratio of base and curing agents), and (3) a physical cross-linker of polysiloxane-treated hydrophobic silica ($SiO_2$—PS) particles (CAB-O-SIL® fumed silica TS-720, CABOT Corp). To predict the miscibility of the blended inks, molecular dynamics (MD) simulations were conducted and the interfacial interaction energy between the physical cross-linker (i.e., $SiO_2$—PS particles) and the surrounding resins was quantitatively evaluated.

Forcite and Amorphous Cell modules in Material Studio (BIOVIA, UK) were used for the MD simulation. The density of the surface treated-layer, composed of one vinyl terminated diphenylsiloxane-dimethylsiloxane copolymer and three trimethylsiloxane terminated methylhydrosiloxane-dimethylsiloxane copolymer main-chains, was set to 0.97 g·cm$^{-3}$. Geometry-optimized 3D models were followed by the anneal protocol in which the temperature of the system was sequentially set to 298, 398, 498, and 598 K, and then decreased in reverse using a constant-volume ensemble (NVT). Each step was performed for 50 ps, and the anneal protocol was repeated 5 times. The interaction energies of the 3D models were obtained after additional NVT dynamics at 298 K for 1,000 ps. The Condensed-phase Optimized Molecular Potentials for Atomistic Simulation Studies (COMPASS) II force field, the Ewald summation method for non-bonding interactions with an accuracy of 0.001 kcal·mol$^{-1}$, the time step of 1.0 fs, the Andersen temperature control method with 1 as the collision ratio, and the Berendsen pressure control method with 0.1 ps as the decay constant were chosen.

An MD simulation was performed on a $SiO_2$—PS particle for comparison to a non-treated (hydroxyl-terminated) silica ($SiO_2$—OH) particle as a control. The results indicated that the interaction energy of the $SiO_2$—PS particle ($-1.852 \times 10^{21}$ kcal·mol$^{-1}$·g$^{-1}$) remained substantially lower than the control $SiO_2$—OH particle ($-6.969 \times 10^{21}$ kcal·mol$^{-1}$·g$^{-1}$), implying that the $SiO_2$—PS particle provided enhanced miscibility with the surrounding resins to better serve as a tractable modifier for the rheological properties of the ink.

To characterize rheological properties, variously blended inks were prepared by varying the weight ratio of the base resin, dilute resin, and $SiO_2$—PS particles from 5.7:3.3:1.0 to 6.0:3.3:0.7, 4.2:5.0:0.8, and 4.5:5.0:0.5, compared to commercial control groups of a dispensable silicone ink (SE 1700, Dow Corning) and a bare PDMS ink (Sylgard 184, Dow Corning). The inks with 5.7:3.3:1.0, 6.0:3.3:0.7, and 4.2:5.0:0.8 ratios and the SE 1700 ink exhibited a gel-like viscoelastic behavior (i.e., G'>G") within the linear viscoelastic (LVE) region (plateau regions) that indicates a printable range without distorting the structural integrity. On the other hand, the ink with 4.5:5.0:0.5 ratio and the Sylgard 184 ink exhibited a liquid-like viscoelastic behavior due to their dominating G" at all shear stresses, which thereby precluded their use for dispensing through a nozzle.

Figure 7:
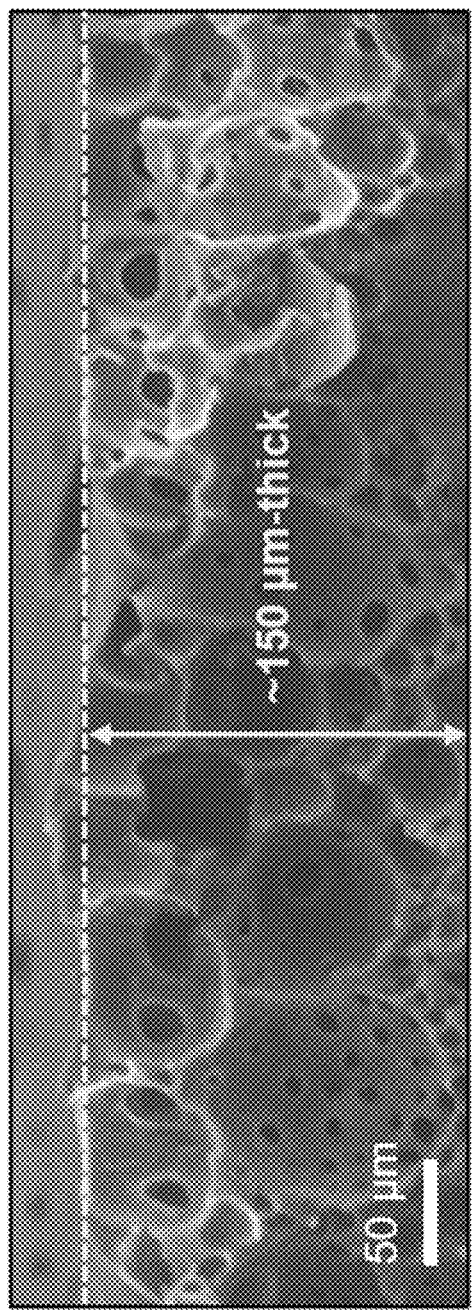
FIG. 7 includes a cross-sectional side view of a SEM image for the sponge-like foam.

The inks exhibited the shear-thinning behavior in which their viscosity decreased with an increase of the shear rate, whereas the Sylgard 184 ink exhibited a zero-shear-rate behavior (plateau curve) at all shear rates. A range of viscosities with high-fidelity formation of micropores (i.e., sponge-like foam) occurred under the hot pressurized steam condition, and the ink with the 6.0:3.3:0.7 weight ratio remained within this range at low shear rates. This ink also substantially extended the working lifetime (i.e., the time to reach the crossover between G' and G") up to 34 hours, as compared to the SE 1700 ink (2 hours) and the Sylgard 184 ink (8 hours). This substantially prolonged working lifetime is essential not only to maintain the structural integrity of the as-printed (i.e., prepolymer material) ink prior to complete polymerization, but also to provide sufficient time for the micropores to form across the entire thickness of the structure up to 150 μm (FIG. 7). The formulated ink was completely polymerized after 15 minutes of annealing at 160° C., whereas the ink mixed with electrically conductive nanomaterials (i.e., Ag flakes) remained unpolymerized even after one hour of annealing at the same condition. In conclusion, the ink with the 6.0:3.3:0.7 weight ratio appeared to best meet the requirements of both the appropriate shear-thinning flow behavior and the prolonged working lifetime, allowing for rapid custom prototyping of the porous medium. Therefore, the prepolymer compositions are particularly suitable as inks for three-dimensional (3D) printing techniques, such as but not limited to direct ink writing techniques.

Stress-strain curves for a printed line (2 cm-long×2 mm-wide×150 μm-thick) made of the ink with the 6.0:3.3:0.7 weight ratio before and after the formation of micropores was compared to control groups made of the SE 1700 ink and the Sylgard 184 ink. The mechanical modulus of the printed line decreased more than 3-fold (E=0.15±0.02 MPa) in the presence of micropores due to their large volumetric porosity (about 70%), which remained substantially lower than the control groups (greater than 1.11 MPa) by nearly or more than 10-fold. The corresponding results obtained from this ink configured into an open mesh layout (8 mm×20 mm) provided an ultralow effective mechanical modulus (E=29±12 kPa) that was comparable to that of human cardiac tissues (E=29–41 kPa). These results implied that the printed biosensor is capable of gently interfacing across the epicardial surface in a way that imposes minimal stress on the tissue.

Mechanical hysteresis and the corresponding energy loss of the printed biosensor under repetitive loading-unloading cycles (greater than five times each) at a strain (ε) of 50% were evaluated. The printed biosensor exhibited substantially suppressed mechanical hysteresis with the lowest energy loss of 4.3±0.5 kJ·m$^{-4}$; a value that was substantially lower than the control group made of the SE 1700 ink (23.6±8.7 kJ·m$^{-4}$) by more than 5-fold. This energy loss gap increased proportionally to the strain. The continuous electrical measurement of the printed biosensor under stretching up to 30% corresponded to the maximum strain of the human heart. The results showed that the electrical hysteresis of the printed biosensor remained substantially low between 0.006 and 0.192 which remains at least 10-fold lower than similar counterparts reported previously. The biosensor was stretched up to nearly 150% prior to its fracture while maintaining its resistance (R/R0) below 9.0. The resistance remained constant below 5.0 even after more than 1,000 cycles of stretching up to 30%. Throughout these tests, no evidence was observed of delamination or leakage of the embedded electrically conductive nanomaterials (i.e., Ag flakes). Moreover, the sheet resistance of the printed biosensor remained nearly unchanged within a range of variation (0.5-2.5 Ω·sq$^{-1}$) when soaked in a bath of distilled (DI) water, phosphate buffered saline (PBS), and ethanol for 12 hours.

Figure 4:
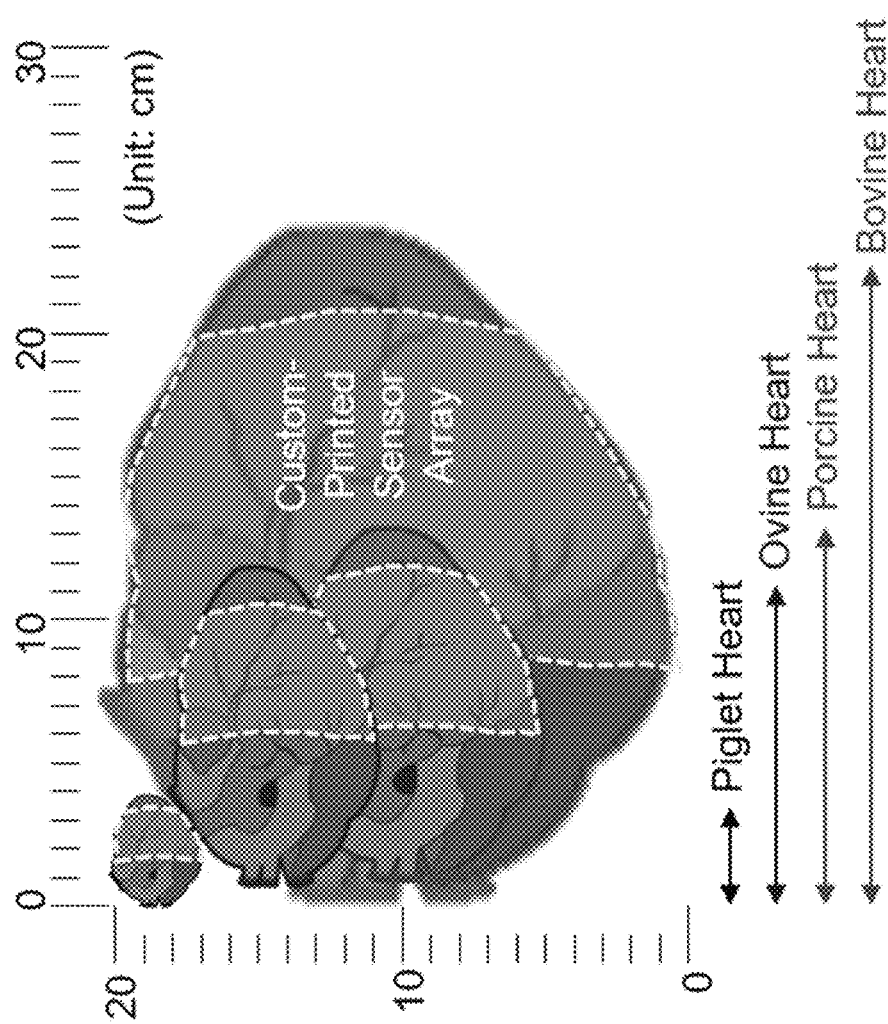
FIG. 4 represents examples of rapid custom prototyping, in which custom-printed biosensors were customized to fit with the enucleated piglet, ovine, porcine, and bovine hearts, represented by cross-sectional views of the hearts.

The well-regulated rheological and mechanical properties of the formulated ink drove the exploration for the rapid prototyping of a custom-designed poroelastic biosensor which were produced in a few hours per batch of a dozen, which could be also useful for spatiotemporal ECG mapping on various animal models with a wide range of heart sizes and shapes, including but not limited to biosensors customized to fit with enucleated piglet, ovine, porcine, and bovine hearts. FIG. 4 schematically represents a cross-sectional view of these hearts for size comparison. All these biosensors were able to accommodate the different sizes and shapes of the hearts at various length scales, while simultaneously forming a seamless contact to the irregular epicardial surfaces due to their substantially low bending stiffness (less than $8.0 \times 10^7$ GPa·µm$^4$). Here, the spatial resolution of these biosensors (i.e., the number of electrodes within a given region) was determined by the feature resolution of the nozzle injection system (i.e., the minimum nozzle size of about 100 µm). For instance, a total of 64 electrodes (i.e., 32 recording channels) on the biosensor were uniformly distributed across the entire surface of the enucleated porcine heart which is similar in size to the human heart. In this study, a bipolar recording configuration was used not only to reduce common-mode noises such as power line interference but also to suppress the crosstalk for high fidelity recording of ECG signals.

The poroelastic nature and the open mesh layout of these biosensors also yielded low normal (peeling) stress to the epicardium tissue (i.e., the minimum adhesion energy per unit area of about 0.5 mJ·m$^{-2}$) and thereby induced a strong capillary adhesion at the interface. This aspect allowed the biosensors to reliably adhere onto the epicardial surface without slipping and to be also detached without significant mechanical impact on the epicardium tissue. ECG waveforms were recorded continuously. The ECG data were collected using a multi-channel data acquisition system (ADInstruments) at a sampling rate of 4 kHz and 1 kHz for the murine and porcine heart, respectively. The data were then filtered using a 5 Hz high-pass filter via the embedded software (LabChart). The data were expressed as a matrix with n (the number of bipolar recording channels)×time based on the spatial location of the recording electrodes and then interpolated using a custom programming code (Python language) for smooth fadeaway of the colors (i.e., voltages) in the spatiotemporal 3D ECG mapping results.

Figure 8:
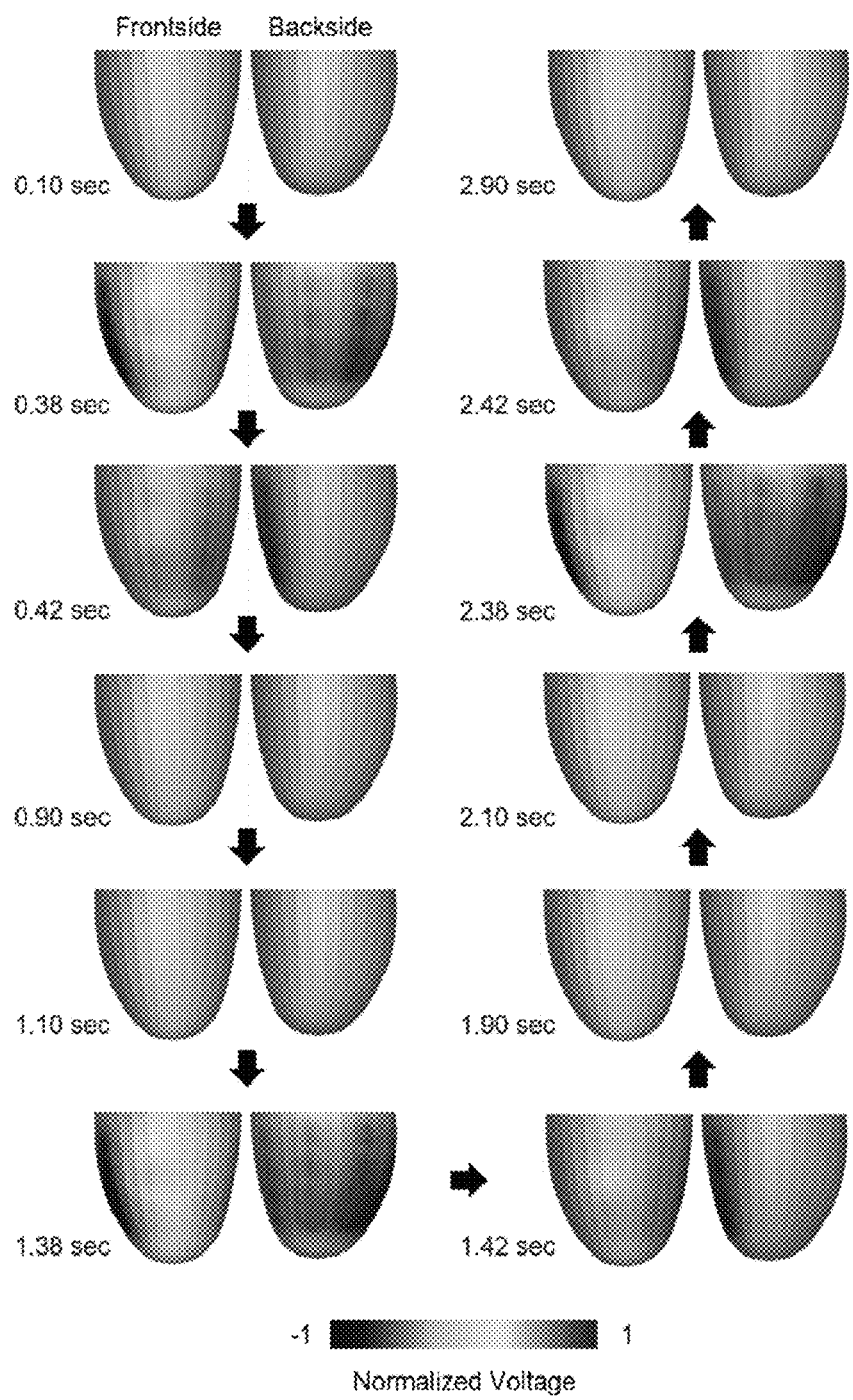
FIG. 8 represents spatiotemporal ECG mapping results for the ex vivo measurement of epicardial ECG signals from the enucleated porcine heart.

Representative epicardial ECG signals were obtained from the enucleated porcine heart by applying an artificial ECG waveform (amplitude=2 mV·cm$^{-1}$; frequency=1 Hz) using a signal generator (Keithley 3390). The corresponding spatiotemporal ECG mapping results are shown in FIG. 8. The ECG signals were followed consistently by those generated from the signal generator, confirming that all 64 electrodes seamlessly interfaced with the epicardial surface. No visible electromechanical movement of the enucleated cardiac tissues was observed throughout these measurements. These observations were consistent when the biosensors were integrated with other organs, such as the enucleated porcine liver. Notably, the quality of the conformal coverage was maintained even when a biosensor was interfaced with the deeply wrinkled surface of a human brain model.

The suitability of the custom-printed biosensors for spatiotemporal recording of epicardial electrocardiogram (ECG) was evaluated in healthy murine (n=5) and porcine hearts (n=2) in vivo. The porcine heart provides a substantial similarity in size and shape to the human heart. The biosensors were placed on the left ventricle after median sternotomy using a water-soluble film (i.e., PVA). Following dissolution of the water-soluble film with the application of a warm saline solution, the biosensors (about 50 µm-thick) adhered intimately to the epicardial surface by capillary adhesion force. Here, the biosensors were configured with a total of 4 and 6 pairs of recording electrodes to cover the total areas of 1.25 cm$^2$ and 50 cm$^2$ for the acquisition of murine and porcine ECG signals, respectively. The electrochemical impedance of the individual electrodes (200 µm×200 µm) was characterized in a phosphate-buffered saline (PBS) solution with a pH of 7.2 at 23° C. as 2.1, 1.5, and 1.0 kΩ at frequencies of 40, 150, and 1,000 Hz, respectively. The remarkably low impedances observed were attributed to the poroelastic properties of the biosensors that provide not only large interfacial areas between electrodes and electrolyte but also rapid solid-state diffusion of charge carriers. The electrochemical impedance of the as-printed biosensors was verified prior to their implementation onto the heart in vivo.

Figure 9:
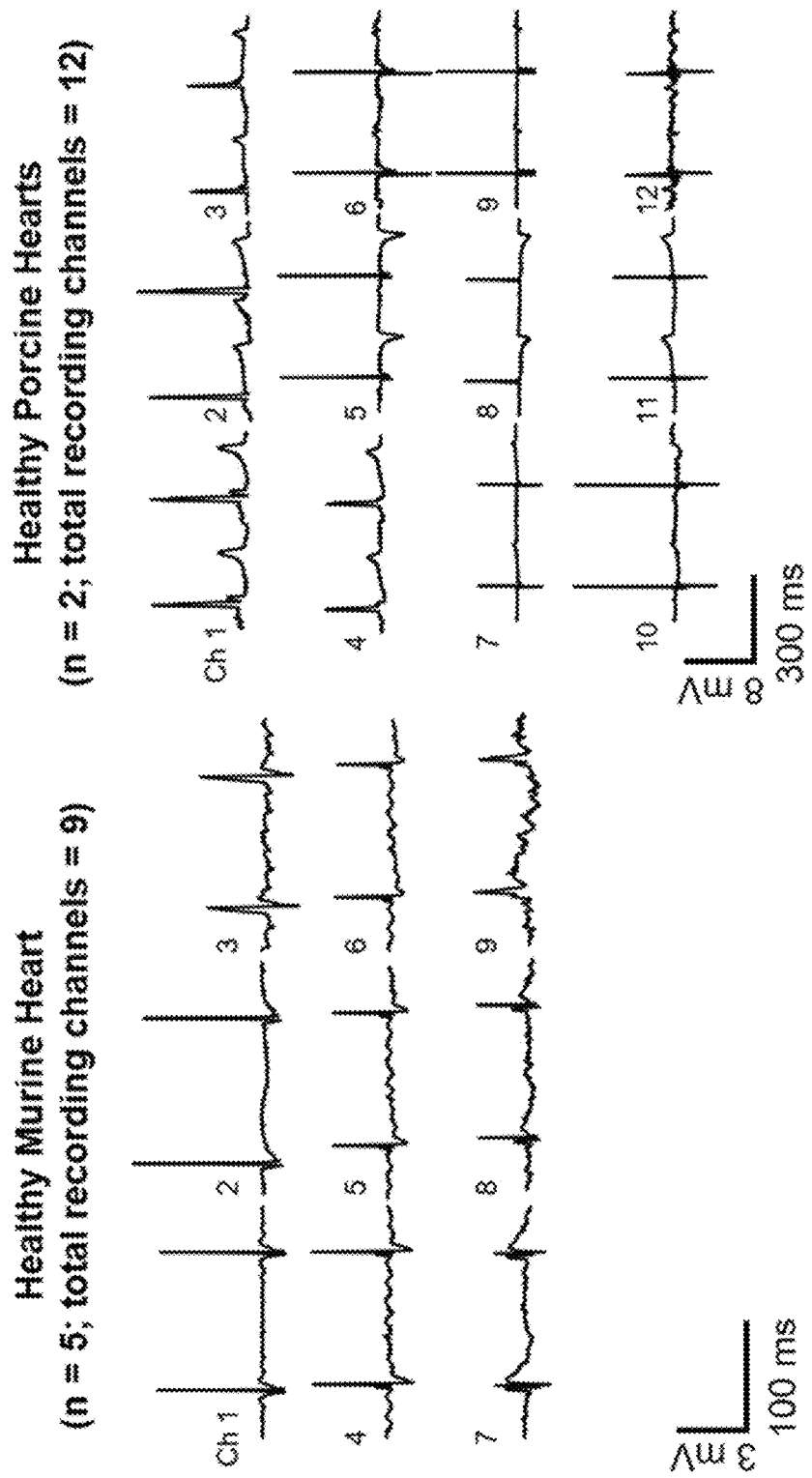
FIG. 9 represent epicardial ECG signals obtained from the healthy murine (n=5) and porcine hearts (n=2).

The exceptionally soft and thin nature of the biosensors enabled them to maintain a highly conformal contact to the epicardial surface under normal cardiac cycles with the murine and porcine heart rates of 529.9±9.3 and 85.4±8.5 beats per minute, respectively. The degree of conformal coverage across the epicardial surface increased with the decreased thickness of the device from 300 µm to 50 µm due to the substantially reduced bending stiffness by more than 200-fold. The raw data of the epicardial ECG signals obtained from all healthy murine and porcine hearts are summarized in FIG. 9, displaying a typical ECG tracing of the cardiac cycle that consists of a P-wave (atrial depolarization), a QRS-complex (ventricular depolarization), and a T-wave (ventricular repolarization)

The corresponding quantitative data of R-R interval, QRS duration, and J-point elevation were measured as 116.3±3.8/764.3±65.4 ms, 2.8±0.5/28.8±16.1 ms, and −0.1±0.9/−0.1±0.4 mV for the murine/porcine hearts, respectively. No J-segment elevation was observed in the ECG recordings for the healthy hearts. The strain-insensitive poroelastic behavior (i.e., the negligible electrical hysteresis under cyclic loading with a strain of less than 30%) of the biosensors and their robust conformal contact across the beating epicardial surface enabled the high-fidelity acquisition of epicardial ECG signals without noticeable degradation in signal quality over time (FIG. 5, top panel).

Figure 5:
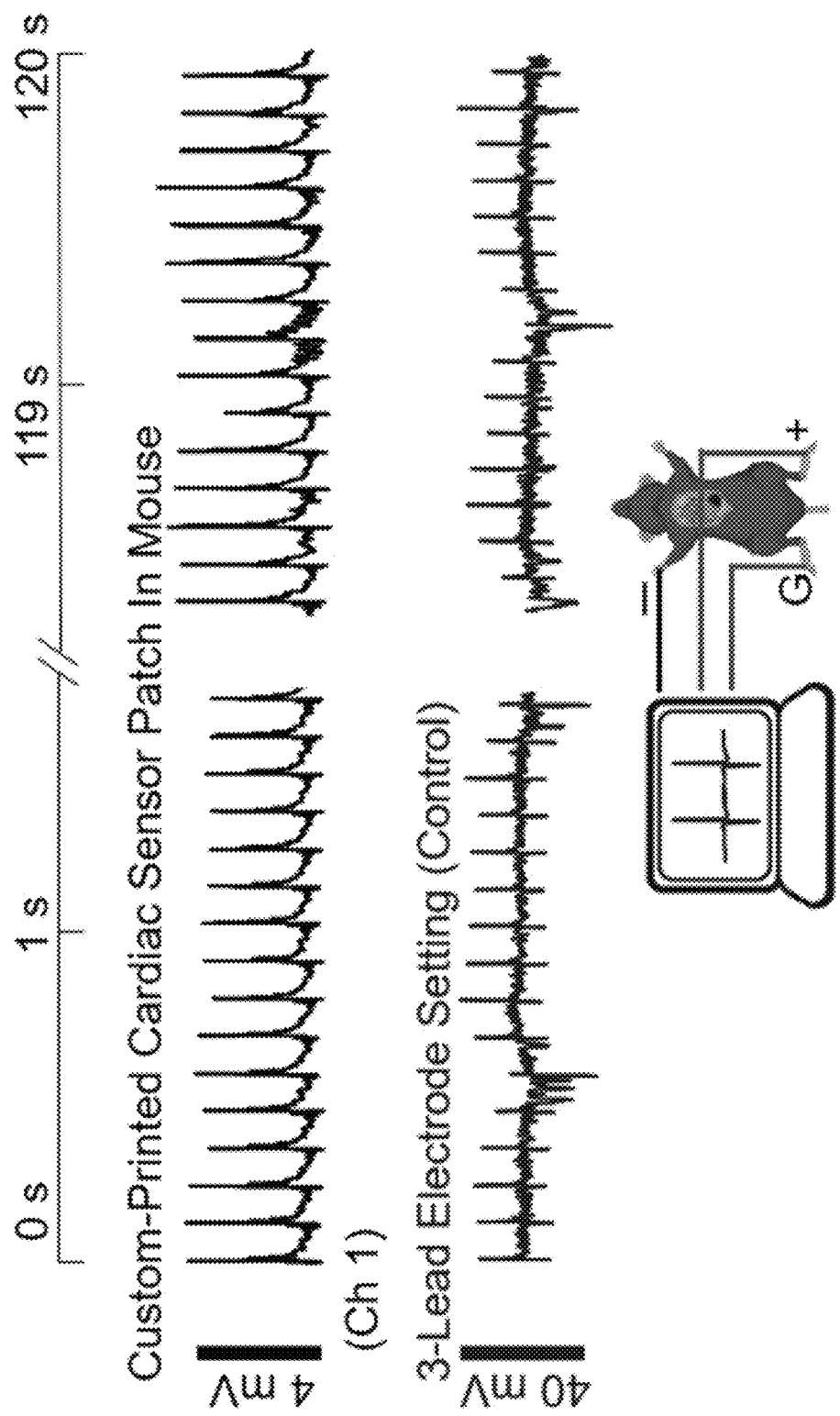
FIG. 5 represents spatiotemporal recording of epicardial ECG signals in vivo, specifically, simultaneously measured ECG signals using the custom-printed biosensor (top panel) and a control 3-lead electrode set (bottom panel) on a murine heart.

To confirm the change of ECG waveforms over time, FIG. 5 (bottom panel) presents the results of control ECG recording that simultaneously occurred across the body of the mouse (i.e., global ECG signals) using commercial 3-lead electrodes (ERT Control/Gating Module Model 1030, SA Instruments, Stony Brook, NY). The amplitude of the global ECG signals was at least 3-fold higher than those of the epicardial ECG signals while the corresponding R-R interval, QRS duration, and J-point elevation were measured as 118.2±5.7 ms, 10.0±0.8 ms, and 2.0±4.5 mV, respectively. Unlike the epicardium ECG signals obtained from the custom-printed biosensor, the global ECG signals obtained from the control measurement setup clearly displayed the shift (i.e., elevation and depression) of the signal baseline caused by the inhalation and exhalation of breathing, respectively.

Intraoperative epicardial mapping is useful in localizing critical regions that indicate the origin of pathophysiological conditions such as arrhythmias after acute myocardial infarction, thereby providing important information to guide definitive surgical treatments, especially when the infarct border needs to be identified. To demonstrate the utility of the custom-printed biosensors in this surgical setting, intraoperative spatiotemporal mapping of epicardial ECG signals was performed in a murine acute myocardial infarction model in vivo. An adult mouse underwent left thoracotomy to expose the ventral portion of the heart, followed by the placement of a custom-printed biosensor (a total of 6 bipolar recording channels) on the epicardial surface to cover the ventricular epicardium.

Figure 6A:
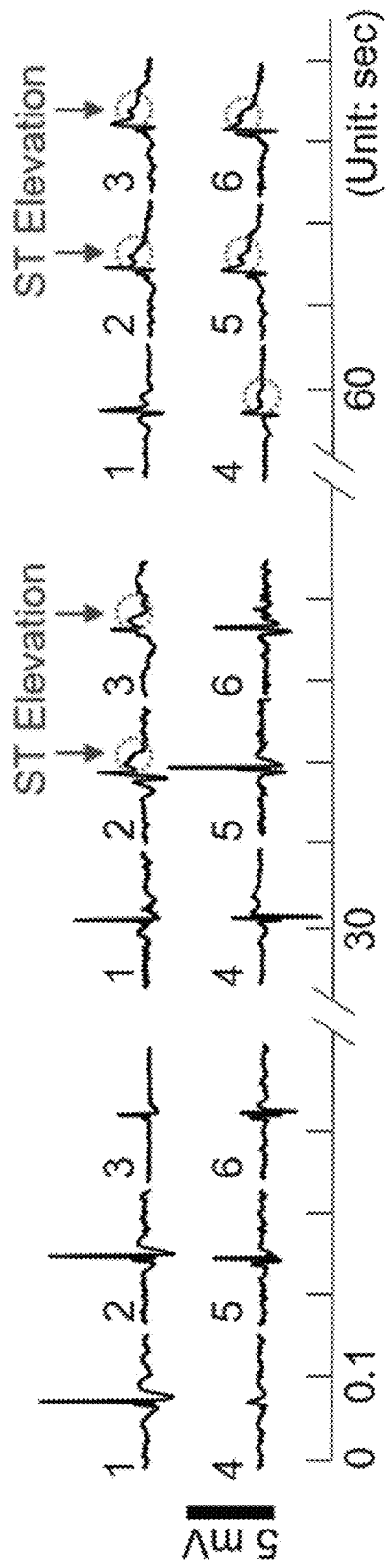
FIGS. 6A and 6B represent intraoperative epicardial mapping in a murine myocardial infarction model.

A surgery to permanently ligate the left coronary artery was performed. Representative results of the epicardial ECG measurements are shown in FIG. 6A. Following approximately 30 seconds of ligation, ST-segment elevation (broken circles in the middle panel) occurred near the ligation point where the sensor channels 2 and 3 were located. After 60 seconds of ligation, the ST-segment elevation was also detected by the sensor channels 4-6, implying that the regional myocardial infarction propagated toward the apex of the heart with a velocity of approximately $0.6 \text{ mm} \cdot \text{sec}^{-1}$. The ECG signals displayed a convex ST-segment, indicating that the corresponding regions experienced ischemia or hypoxic conditions.

Figure 6B:
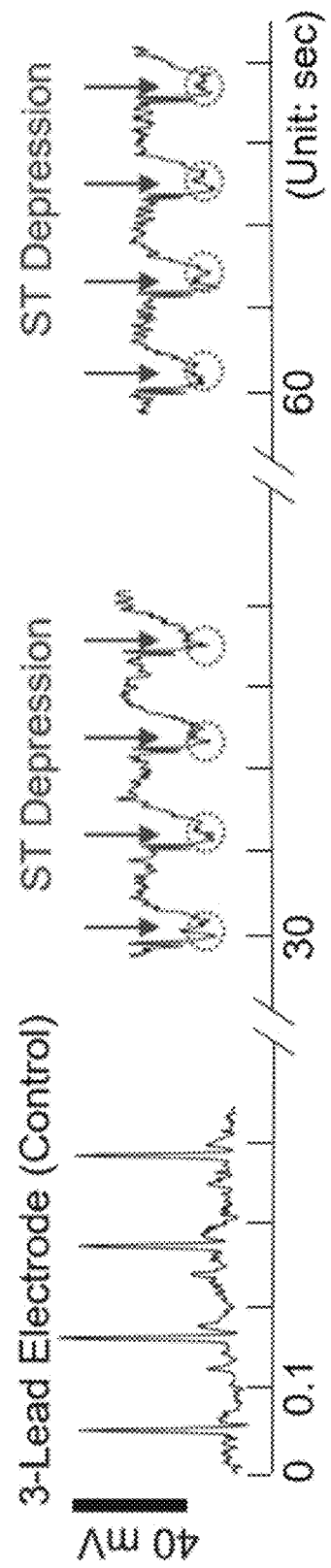

A total of nine infarction ECG data (i.e., ST-elevation) captured from three different biosensors on mice (n=5), i.e., 1×1 (n=3), 2×2 (n=1), and 2×3 (n=1), showed consistent results, along with the corresponding quantitative data of R-R interval, QRS duration, and J-point elevation. The data exhibited the prolongation of QRS duration, the elevation of J-segment, the metrics of systolic dysfunction, and the elevation of ST-segment after about 40 seconds of ligation, showing statistical differences from those obtained before ligation using one-way ANOVA with Tukey's post hoc test with significance is set at $p<0.05$. FIG. 6B presents the results of control measurements obtained simultaneously using a 3-lead electrode set, displaying reciprocal ST-segment depression to confirm the occurrence of an ischemic event. The control measurements also displayed both reciprocal ST-segment depression and elevation within seconds of left coronary artery ligation, which typically occurs in the 3-lead electrode recording configuration. These ST-segment depression and elevation were consistently observed during the surgery and throughout the recording duration of 30 minutes after ligation. The results also imply that the biosensors maintained a robust and intimate coupling to the epicardial surface without changing position throughout the recording period (30 minutes) that involved more than 10,000 individual beats.

The semi-transparency of the biosensors, due to the open mesh layout and thin-film design (50 μm-thick), enabled simultaneous ultrasound mapping, as a means for validating the location and size of the myocardial infarction region in real time. An experimental setup was configured to include a high-frequency ultrasound system (Vevo3100, FUJIFILM VisualSonics Inc). A warmed ultrasound gel (Ultrasound Transmission Gel, Parker, Inc) was applied directly to the device placed on the left ventricle of the heart. Short-axis ultrasound image clearly visualized the biosensor along with the epicardium and endocardium of the heart. The results showed that QRS-complex appeared at the initiation of the left ventricle contraction while P-wave prior to the QRS-complex corresponded to the atrial kick responsible for pushing residual blood from the left atrium to the left ventricle (i.e., the phase of diastolic left ventricular filling). The overall quality of both the ultrasound images and the simultaneously recorded ECG signals was unaffected by motion artifacts (e.g., the heartbeat and respiration) through the robust conformal coupling to the epicardial surface. These results confirmed that the imaging artifacts (e.g., the shadow of the recording electrode pairs) were minimized with the decreasing thickness of the biosensors. A post-processed 3D image reconstructed from both the ultrasound images and the spatiotemporally recorded ECG signals after 60 seconds of ligation confirmed that the acute ST-segment elevation was detected by the sensor channels 2-6 (i.e., positive voltages) while the areas nearby the sensor channel 1 remained unaffected (i.e., negative voltages).

Evaluation of the in vivo biocompatibility and anti-biofouling properties of the custom-printed biosensors and their effect on cardiac function were investigated. To this end, the cellular toxicity and inflammatory response of a printed biosensors was first evaluated. A cell compatibility assay for a biosensor that was seeded with heart myoblast (H9C2) cells in a 24-well plate (Fisher Scientific, USA), measured using a colorimetric assay kit (MTT 3-(4,5-dimethylthiazol-2-yl)-2,5-diphenyltetrazolium bromide, Sigma-Aldrich, USA), indicated that the proliferation rate of the cells increased consistently throughout the assay period (24 hours), producing no significant difference compared to a control and a bare sponge-like foam. The device without the overcoat of Au showed considerably reduced cell variability (less than 70%), suggesting toxicity.

Histological cross-sectional views of the murine cardiac tissues that were stained with both hematoxylin-eosin (H&E) and Masson's trichrome (MTC) on day 14 post-implant of the device revealed moderate chronic inflammation including the formation of a granuloma for the 14-days implantation. Magnified views of granuloma, macrophages, and multi-nucleated giant cells at the surface of the implanted device suggested chronic inflammation. An increased thickening of epicardium near the implanted biosensor was observed on days 1, 7, and 14 post-implants, progressing from 44.4±8.3 μm to 645.9±5.3 μm in thickness. The results indicate that chronic inflammatory response directed towards the implanted biosensor.

Although chronic inflammation due to a foreign body response was present at the implant site after implantation, its effects on intraoperative epicardial mapping or cardiac ejection fraction were insignificant. While short-term intraoperative implantation side effects cannot be ruled out, no issues were observed during intraoperative epicardial mapping or cardiac ejection fraction. The inflammation may be reduced through the inclusion of selective anti-biofouling surface coating (except for the areas of the Au recording electrodes) or the application of nanoscale texturing across outer surfaces of the biosensors. The nano-textured surface of the biosensors could further improve the adhesion to the epicardium owing to the hydration characteristics at the interface.

Next, the biofouling resistance of the biosensor was evaluated by quantifying the surface fluorescence intensity after two hours of incubation in 6 $\text{mg} \cdot \text{ml}^{-1}$ of a bovine serum albumin-fluorescein conjugate (BSA-FITC; A23015, Fisher Scientific, USA) diluted with 1×PBS, as compared to control groups made of the SE 1700 ink and the Sylgard 184 ink and prepared on a pristine glass. The corresponding results of one-way repeated measures analysis of variance (ANOVA) tests (n=5 per group) showed statistical differences between groups. The results show that the fluorescence intensity of the biosensor (0.7±0.5 a.u.) remained significantly lower than that obtained using the Sylgard 184 ink (10.2±5.5 a.u.) and the glass (15.4±6.1 a.u.), suggesting that the porous surface of the biosensor effectively prevented the accumulation of proteins. The control group made of the SE 1700 ink produced a statistically comparable degree of biofouling resistance (2.8±1.7 a.u.).

Finally, the effect of the biosensors on cardiac function was evaluated when implanted on the epicardial surface of the murine heart and then sutured prior to anesthetic recovery. On days 0, 1, 7, and 14 post-implants, ultrasound images were acquired of the left ventricle in a long-axis (LAX) plane. With these LAX ultrasound images, the endocardial surface of the left ventricle was segmented at both end-diastole and peak-systole and used to calculate end-diastolic volume (EDV) and peak-systolic volume (PSV) using the Simpson's rule of discs. The ejection fraction (i.e., the percentage of blood pumped by the left ventricle during contraction) was then calculated using these volumes to assess global cardiac function. The results confirm that the ejection fraction of the heart remained within the normal range (60-70%) without noticeable decrease throughout the entire implantation period, which was clearly higher than the abnormal ranges for ischemia reperfusion injury (40-60%) and permanent ligation (20-40%).

The results obtained during the above-reported investigations suggest a route towards rapid prototyping of thin and stretchable poroelastic biosensors with a custom-fit design that can meet a specific geometric demand in clinical practices. The determination of a new formula of prepolymer material for a dispensable silicone ink leads to optimal rheological properties that enable both (1) the high-precision DIW of arbitrary functional microarchitectures at various length scales and (2) the capability of turning the printed microarchitectures into a porous medium in a deterministic manner. Uniquely, the resulting biosensors are monolithic in which the densely networked electrically conductive nanomaterials are embedded through the internal pores in a way that eliminates a risk of compromising their structural integrity even under large deformations.

The poroelastic nature of the biosensors can be used to establish a robust coupling to the epicardial surface and also remain insensitive to periodic cardiac cycle and respiratory motion without significant mechanical and electrical hysteresis. The simultaneous intraoperative monitoring of both epicardial ECG and ultrasound signals in a murine acute myocardial infarction model suggests a potential utility of the device for high-fidelity acquisition of real-time 3D cardiac mapping, which may guide surgical interventions such as ablation for arrythmias. The in vivo studies also suggest an opportunity to further increase the spatial resolution of these biosensors (i.e., the number of electrodes within a given region) in order to alleviate the need for reliance on post-processing algorithms to map the site of myocardial infarction in a higher resolution. The basic concept of this approach may be potentially expandable for continuous monitoring of lethal cardiac diseases through chronic implantation of the biosensors and integration with current state-of-the-art means of wirelessly communicating power and data.

As previously noted above, though the foregoing detailed description describes certain aspects of one or more particular embodiments of the invention and investigations associated with the invention, alternatives could be adopted by one skilled in the art. For example, the biosensors and their components could differ in appearance and construction from the embodiments described herein and shown in the drawings, functions of certain components of the biosensors could be performed by components of different construction but capable of a similar (though not necessarily equivalent) function, process parameters such as temperatures and durations could be modified, and appropriate materials could be substituted for those noted. In addition, the biosensors are applicable to use with various organs (such as the heart, stomach, brain, skin, etc.), as well as subjects other than organs, for example, clothing. Accordingly, it should be understood that the invention is not necessarily limited to any embodiment described herein or illustrated in the drawings.

The invention claimed is:

1. A poroelastic material formed by a process comprising the steps of:
   depositing a prepolymer composition on a substrate, wherein the prepolymer composition comprises a mixture of a base resin comprising a silicone-based copolymer, a methylhydrosiloxane copolymer, and a siloxane monomer, a dilute resin comprising an elastomer and at least one curing agent, and a physical cross-linker;
   annealing the prepolymer composition in a pressurized steam environment at a temperature and for a duration sufficient to form a porous medium having a solid matrix formed of a polymer derived from the prepolymer composition;
   infiltrating the porous medium with a liquid comprising electrically conductive nanomaterials such that the electrically conductive nanomaterials are located within pores of the porous medium; and
   evaporating the liquid such that the electrically conductive nanomaterials remain in and/or connected through the pores of the porous medium.

2. The poroelastic material of claim 1, wherein
   the silicone-based copolymer of the base resin comprises a vinyl terminated diphenylsiloxane-dimethyl silicone copolymer;
   the elastomer of the dilute resin comprises a polydimethylsiloxane elastomer; and
   the physical cross-linker comprises polysiloxane-treated hydrophobic silica ($SiO_2$-PS) particles, or hydrophobic silica particles, or hydrophobic particles, or any mixture thereof;
   wherein the prepolymer composition has a specific weight ratio of about 4.2 to 6.0 base resin: about 3.3 to 5.0 dilute resin: about 0.1 to 2.0 physical cross-linker.

3. The poroelastic material of claim 1, wherein the electrically conductive nanomaterials are formed of silver, or a silver alloy, or electrically conductive nanomaterials, or any mixture thereof.

4. The poroelastic material of claim 1, wherein the porous medium having a solid matrix forms a solid foam structure, and wherein the pores of the solid foam structure have diameters of greater than 5 micrometers.

5. The poroelastic material of claim 1, wherein the porous medium having a solid matrix forms a solid foam structure, and wherein the solid foam structure has a Young's modulus (E) of less than or equal to about 150 kPa.

6. A biosensor comprising:
   a first layer formed of a poroelastic material comprising a porous medium having a solid matrix formed of a polymer material and electrically conductive nanomaterials in and/or connected through pores of the porous medium;
   a second layer formed of metallic material located on a first surface of the first layer, the second layer forming interconnections with the electrically conductive nanomaterials of the poroelastic material in the first layer;
   a third layer formed of a biocompatible metallic material located on and covering the second layer; and a fourth layer formed of a polymer insulator material located on a second surface of the first layer.

7. The biosensor of claim 6, further comprising a mesh frame comprising an array of two or more electrical traces coupled to one another, each of the traces comprising the first layer with the second, third, and fourth layers deposited thereon.

8. The biosensor of claim 7, further comprising a biocompatible, water-soluble film secured to the mesh frame and configured as a temporary substrate therefor.

9. A method comprising:
depositing a prepolymer composition on a substrate;
annealing the prepolymer composition in a pressurized steam environment at a temperature and for a duration sufficient to form a porous medium having a solid matrix formed of a polymer derived from the prepolymer composition;
infiltrating the porous medium with a liquid comprising electrically conductive nanomaterials such that the electrically conductive nanomaterials are located within pores of the porous medium; and
evaporating the liquid such that the electrically conductive nanomaterials remain in and/or connected through the pores of the porous medium to result in a poroelastic material.

10. The method of claim 9, further comprising producing the prepolymer composition by mixing:
a base resin comprising a vinyl terminated diphenylsiloxane-dimethyl silicone copolymer, a methylhydrosiloxane copolymer, and a siloxane monomer;
a dilute resin comprising a polydimethylsiloxane elastomer and one or more curing agents; and
a physical cross-linker comprising polysiloxane-treated hydrophobic silica ($SiO_2$-PS) particles, or hydrophobic silica particles, or hydrophobic particles, or any mixture thereof;
wherein the prepolymer composition has a specific weight ratio of about 4.2 to 6.0 base resin: about 3.3 to 5.0 dilute resin: about 0.1 to 2.0 physical cross-linker.

11. The method of claim 10, wherein the base resin comprises about 64.5 wt % of the vinyl terminated diphenylsiloxane-dimethyl silicone copolymer, about 33.5 wt % of the methylhydrosiloxane copolymer, and about 2.0 wt % of the siloxane monomer.

12. The method of claim 9, wherein the liquid is hexane and the electrically conductive nanomaterials are formed of silver, or a silver alloy, or electrically conductive nanomaterials, or any mixture thereof.

13. The method of claim 9, wherein the prepolymer composition is deposited with a direct ink writing 3D printing process, and wherein the prepolymer composition comprises a mixture of a silicon-based base resin, a polydimethylsiloxane-based dilute resin, and a physical cross-linker.

14. The method of claim 9, further comprising producing a biosensor wherein at least a first layer of the biosensor is formed of the poroelastic material, the method further comprising:
depositing a second layer formed of metallic material on a first surface of the first layer, the second layer forming interconnections with the electrically conductive nanomaterials of the poroelastic material in the first layer; and
depositing a third layer formed of a biocompatible metallic material on the second layer such that the third layer covers the second layer; and
depositing a fourth layer formed of a polymer derived from the prepolymer composition on a second surface of the first layer.

15. The method of claim 14, wherein the first, second, third, and fourth layers deposited define a first electrical trace of the biosensor, the method further comprising repeating the steps of claim 14 to produce at least a second electrical trace, and depositing the prepolymer material to form links physically coupling the first and second electrical traces and thereby define a mesh frame.

16. The method of claim 14, further comprising:
imaging a subject;
producing a model of the subject;
forming the first layer such that the first layer is configured to conform with an exterior surface of the subject; and
applying the biosensor to the subject.

17. The method of claim 16, wherein the subject is an organ of an individual or apparel adapted to be worn by an individual.

18. The method of claim 17, wherein the subject is the heart of the individual and the method includes using the biosensor for real-time spatiotemporal mapping of electrocardiography.

19. The method of claim 18, further comprising simultaneously performing real-time spatiotemporal mapping with ultrasound signals while using the biosensor.

20. The method of claim 16, further comprising applying a biocompatible, water-soluble film to the biosensor, using the film as a temporary substrate as the biosensor is applied to the subject, and then dissolving the film prior to use of the biosensor.

* * * * *